July 29, 1969     W. H. CHANNELL     3,458,649

CABLE SPLICE SLEEVE

Filed Nov. 21, 1966

INVENTOR,
WILLIAM H. CHANNELL
BY
*Calvin Brown*
ATTORNEY

United States Patent Office 3,458,649
Patented July 29, 1969

3,458,649
CABLE SPLICE SLEEVE
William H. Channell, 122 Oak Tree Drive,
Glendora, Calif. 91740
Filed Nov. 21, 1966, Ser. No. 595,888
Int. Cl. H02g 15/18
U.S. Cl. 174—93                                    4 Claims

ABSTRACT OF THE DISCLOSURE

The invention provides a device including a sleeve used to house a cable splice wherein grommets are provided for each end of the sleeve, which grommets may have bushings to afford a method of sealing all cable sizes within the size range of the grommets and of the sleeve.

---

The present invention relates to a cable splice sleeve adaptable to use for telephones, telegraph, power cables, as well as block, underground, house and aerial cables.

An object of the invention is a cable splice sleeve so constructed and arranged as to cover a cable splice and to seal the spline simply and effectively against leak of gas from the sleeve and to prevent moisture from entering the sleeve, in a simple and expeditious manner utilizing few parts in the sleeve fabrication.

It has been the practice in the past after a cable splice is within a sleeve, to close both ends of the sleeve which has been accomplished by utilizing putty in tape form, to build up the cable diameter at each end and to squeeze the tape between washers. This method is not satisfactory as usually an epoxy cement is used with the tape and washers which renders dismantling of the sleeve and cables practically impossible. Furthermore, in severe temperature conditions the epoxy will not expand the same as the cable with the result that pressure is lost within the sleeve if the sleeve is pressurized.

An object of the invention is to provide a novel construction for closing ends of the sleeve around the cable, and which construction may maintain the interior of the sleeve pressurized about a cable splice.

The present invention is easy to install for the purpose of enclosing a splice within a minimum of time and may be performed by a semi-skilled worker.

A further object of the invention is the provision of a cable splice sleeve or enclosure of simple construction, utilizing few parts for maintaining the cable splice pressurized within the sleeve.

Another object of the invention is to provide grommet bushings having variable size holes or bores adapted to accommodate and receive different diameter cables, the bushings having a common external diameter to fit a hole of fixed diameter in the grommet adapter thus saving the expense of providing many grommet adapters having different hole diameters. Further, the grommet bushings and the grommet adapters use compatible material to effect a bond therebetween and to prevent separation when the grommet adapter is received within a sleeve of a given diameter.

Figure 1:
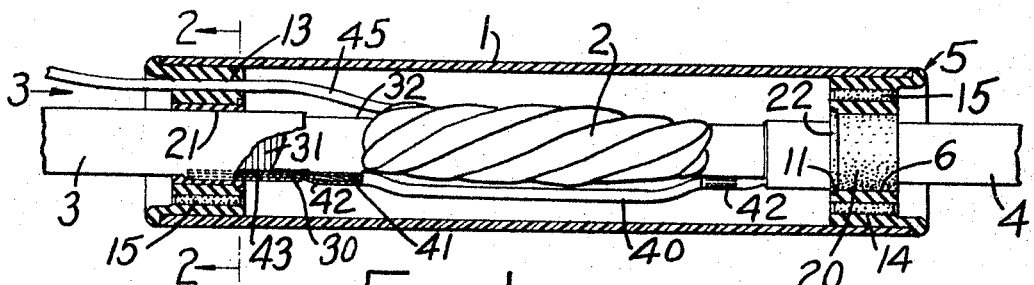
FIGURE 1 is a fragmentary longitudinal sectional view of a cable splice sleeve housing a cable splice.

Referring to the drawing, the cable splice sleeve includes sleeve 1 adapted to receive a splice 2 of a pair of cables 3 and 4, the splice sleeve being provided at its ends with means for sealing the cables and the sleeve so as to maintain the interior of the sleeve air and water tight. The means for sealing the cables and sleeve comprises for each end a grommet adapter 5 which may be formed from a material such as neoprene, the grommet having an uniform diameter bore 6, an enlarged counterbore 7 and an end flange 9. The external surface of the grommet adapter is tapered from the end flange 9 downwardly toward the opposite end 10 of the grommet adapter. The end 10 of the grommet adapter is internally provided with a counterbore or annular groove 11. In the present instance the grommet adapter flange 9 has a hemispherical or arcuate outer surface, as shown at 12. The grommet adapter may be provided with a series of transverse holes designated generally as 13, forming access means for branch splices from the cable splice as illustrated at 45 in FIGURE 1. Other holes 13, as for instance shown at 14, may house plugs 15 for closing the holes 13 until use thereof is required. The plugs 15 are formed of material which is compatible with the material of the grommet adapter such as a soft rubber or neoprene.

Figure 4:
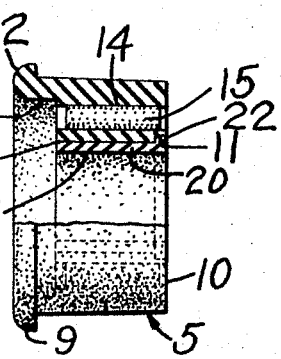
FIGURE 4 is a fragmentary, partially sectional view on the line 4—4 of FIGURE 3.
Figure 5:
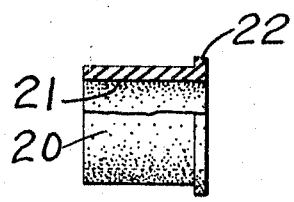
FIGURE 5 is a fragmentary, partially sectional view, on an enlarged scale, of a grommet bushing used in the practice of the invention.
Figure 6:
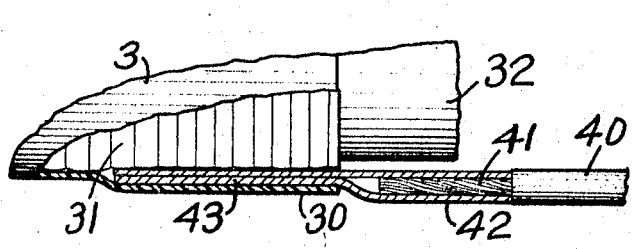
FIGURE 6 is a fragmentary view, partly in section, and on an enlarged scale, of a cable shield connector.
Figure 7:
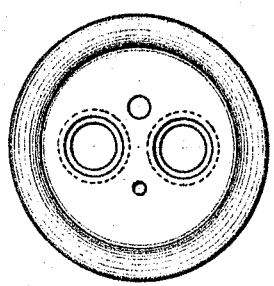
FIGURE 7 is an end elevation of a modified form of grommet adapter for two cables; and, FIGURE 8 illustrates a strip holding grommet bushings of like diameter and with axial bores to accommodate different diameters of cable.
Figure 8:
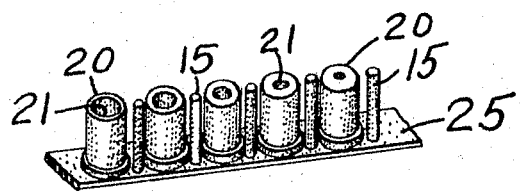

Cables such as shown at 3 and 4 may vary in external diameter and the bore 6 of the grommet adapter may be of a greater diameter than the diameter of the cable. As has been pointed out before, it is customary for the workmen to seal, bond and pressurize the splice by utilizing putty in tape form to build up the cable and to squeeze the putty between two washers placed within the sleeve. This is time consuming and not always satisfactory in actual service. Therefore, the present invention contemplates use of bushings 20 as shown in FIGURE 5 which have a uniform bore 21 and an external end flange 22. A bushing bore diameter is selected which will closely fit the external diameter of the cable. The bushing is received within the uniform bore 6 of the grommet adapter and moved so that the flange 22 is received within the annular groove or counterbore 11 for the end 10 of said grommet adapter, as illustrated in FIGURE 4. The length of the bushing 20 is equal to the length of the bore 6 of the grommet adapter. As shown in FIGURE 8, it is intended in the practice of the present invention that a strip 25 should carry upstanding bushings 20 in spaced relationship. As shown, each of the bushings has a bore 21 which varies as to diameter and all of the bushing bodies have the same external diameters. FIGURE 8 also shows a series of plugs 15 interposed between the different bushings for easy removal and use. All of the bushings, as well as the strip 25, are formed of the same material as the grommet adapter, such as neoprene.

The cables 3 and 4 vary in construction and the cables in the drawing have an outer sheath 30 which may be rubber or other insulation material, an inner steel armour tape 31, and an inner insulation sheath 32.

The operation, uses and advantages of the invention just described are as follows.

Figure 2:
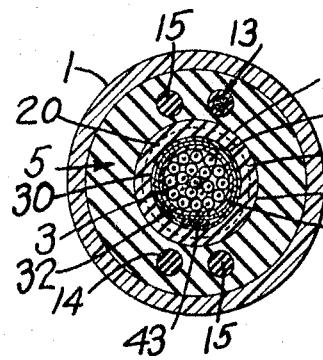
FIGURE 2 is a sectional view on the line 2—2 of FIGURE 1, and on an enlarged scale.
Figure 3:
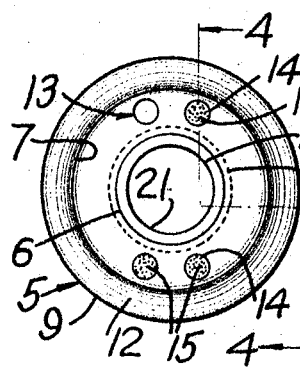
FIGURE 3 is an end elevation on an enlarged scale, looking in the direction of the arrow 3 of FIGURE 1, of the grommet per se.

When a single cable splice such as shown at 2 is to be formed, a given length and diameter of sleeve 1 is selected and the cable wires for cables 3 and 4 are exposed for the purpose of joinder to form the splice. Before the wires are interconnected, grommet adapters are placed on their respective cables such as 3 and 4 as are likewise selected grommet bushings, the bushing selected having a bore diameter providing close fit upon the cable in each instance. As stated, the cable sleeve is likewise carried upon one of the cable lengths so that the cable splice may be made. The splice having been formed and wrapped, as shown at 2, the cable sleeve may be moved to enclose the splice as shown in FIGURE 1. This will likewise include a cable shield connector such as shown at 40, the wire 41 of which may be enclosed within a tube 42 for each end of the wire, the tube being flattened as shown at 43 for insertion between the outer sheath 30 and the steel armour tape 31. This is performed for both cables 3 and 4. The sleeve 1 is then moved over the splice so that the grommet adapters with the bushings may be positioned within ends of the sleeve. Thus the bushing for cable 3 is positioned within the bore of the grommet adapter as shown in FIGURES 1, 2 and 4 and moved along the cable 3 so that the bushing adapter is positioned within an end of the sleeve, the flange 9 engaging the end of the sleeve. A branch splice 45 from the cable splice 2 is extended through one of the holes 13 upon removal of a plug 15 and prior to the insertion of the grommet adapter within the sleeve. When the grommet adapter and its bushing are moved upon the cable within the sleeve 1, the sleeve being of uniform internal diameter, the grommet adapter tends to compress due to the tapered outer surface 5 thereof, and this compression securely holds the bushing in tight engagement with the cable. The same procedure is followed for the opposite end of the sleeve 1 and for the cable 4. If it is desired to pressurize the interior of the sleeve around the cable splice, a tube (not shown) may be inserted through one of the holes 13 upon removal of a plug 15, the tube being provided with an external valve which permits a gas to enter the sleeve under pressure.

It should be pointed out that the small end or the end of smallest diameter 10 of the grommet adapter is formed to receive the flange of the bushing 20. In other words, the bushing is shouldered within the grommet adapter. It may be desired that both the bore of the bushing and the external tapered surface of the grommet be lubricated to facilitate sliding movement of the grommet adapter and the bushing upon the cable for positioning within the sleeve and lubrication for this purpose may be obtained. It has been found that after a short period of time the lubrication allows the grommet to bind to the sleeve to prevent ready separation therebetween. It has been found in actual practice that care should be exercised in securing the bushings within the grommet adapters and that the grommet adapters should be pushed over the grommet bushings utilizing lubrication. Furthermore, it is advisable to push the grommet with its bushing into the cable sleeve by hand and to assure that the flange 9 closely abuts an end of the sleeve as shown in FIGURE 1. As has been stated, the present construction gives the installer a selection of bushings having different diameter holes for receiving a cable. The bushing holes are so selected that bushings of proper size will closely and easily embrace the cable. As the external diameters of all the bushings on the strip 25 are the same, the bushings will fit easily within the fixed diameter bore 6 of the grommet adapter. It is a known fact that cables vary in size and when placed under tension, tend to reduce in external diameter. However, the present system for a splice sleeve requires that it is only necessary to select the grommet and bushing to fit the cable and still maintain a sealed engagement between the grommet, the bushing, the cable and the sleeve. In the past it has been necessary for the operator to know the cable diameter in order to furnish a rubber grommet of proper size. However, with the present invention a grommet with its bushing will fit all sizes of the cable within a usable range.

I claim:

1. A cable splice sleeve, including: a uniform diameter sleeve formed of insulation material, a grommet adapter fitted within each end of the sleeve, each grommet adapter provided at one end with an external flange for engagement with a sleeve end and formed with an uniform longitudinal bore, each grommet adapter having an external surface tapering from the flange to the opposite end thereof to provide a reduced diameter end, the bore of each grommet adapter at the reduced diameter end provided with an enlarged counterbore, a bushing provided at one end with a flange, said bushing positioned within the bore of the grommet adapter with the bushing flange received within the enlarged counterbore, and said bushing length being substantially equal to the length of the bore of said grommet adapter.

2. The device of claim 1 characterized in that each bushing has a bore diameter such that it will closely fit the external surface of a cable when the cable end is introduced into the sleeve and spliced to another cable end; the tapered outer surface of each grommet adapter, when received within the uniform bore of the sleeve, compressing the grommet adapter and bushing to make a tight seal around the cable end at each end of the sleeve.

3. A cable splice sleeve including: an elongated sleeve of insulation material adapted to enclose a cable splice with the cable ends extending outwardly from both ends of said sleeve; a grommet adapter within the sleeve at each end thereof, each grommet adapter being formed of soft insulation material, each grommet adapter having an external surface that is tapered from one end of the adapter to the other end, said tapered surfaces tightly fitting within the ends of the sleeve, each grommet adapter having a central bore of substantially greater diameter than the diameter of the cable ends that are to be spliced; soft insulation bushings having a close sliding fit within the central bores of the respective grommet adapters, yet are relatively immovable when positioned in the grommet adapters; the bushings each having a uniform bore which is adapted to closely fit the external surfaces of a cable end; the tapered outer surface of each grommet adapter causing a compression of the grommet adapter and of the bushing within its bore to make a tight seal around the cable and at each end of said sleeve.

4. The device as set forth in claim 3, characterized in that each grommet adapter is provided with a plurality of transverse holes, and plugs are frictionally secured within said holes to seal the same and being readily removed by driving, so that a branch from a splice within the sleeve may be passed through any one of said holes, after removal of its plug, and the branch may extend outside the sleeve.

References Cited

UNITED STATES PATENTS 3,215,613   11/1965   Lainson _____ 174—93 XR

DARRELL L. CLAY, Primary Examiner

U.S. Cl. X.R.

161—109; 174—77, 78